(12) United States Patent
Rüegg

(10) Patent No.: US 8,973,362 B2
(45) Date of Patent: Mar. 10, 2015

(54) METHOD AND DEVICE FOR PRODUCING EXPLOSIONS

(75) Inventor: Hans Rüegg, Waltenschwil (CH)

(73) Assignee: Explo Engineering GmbH, Waltenschwil (CH)

( * ) Notice: Subject to any disclaimer, the term of this patent is extended or adjusted under 35 U.S.C. 154(b) by 1041 days.

(21) Appl. No.: 13/061,978

(22) PCT Filed: Sep. 1, 2009

(86) PCT No.: PCT/CH2009/000294
§ 371 (c)(1), (2), (4) Date: Mar. 25, 2011

(87) PCT Pub. No.: WO2010/025574
PCT Pub. Date: Mar. 11, 2010

(65) Prior Publication Data
US 2011/0180020 A1   Jul. 28, 2011

(30) Foreign Application Priority Data

Sep. 4, 2008 (CH) ........................................ 1413/08

(51) Int. Cl.
- *F01B 29/08* (2006.01)
- *F02B 75/12* (2006.01)
- *G10K 15/04* (2006.01)
- *F28G 7/00* (2006.01)
- *G01V 1/116* (2006.01)

(52) U.S. Cl.
CPC ................ *G10K 15/043* (2013.01); *F28G 7/00* (2013.01); *F28G 7/005* (2013.01); *G01V 1/116* (2013.01)

USPC .................. 60/632; 123/1 R; 123/2; 102/301

(58) Field of Classification Search
USPC .......................... 60/632; 123/1 R, 2; 102/301
See application file for complete search history.

(56) References Cited

U.S. PATENT DOCUMENTS

| 1,682,305 | A | * | 8/1928 | Nilson .......................... 123/1 R |
| 2,132,646 | A | * | 10/1938 | Rieppel et al. ................ 123/1 R |
| 2,248,989 | A | * | 7/1941 | Hanson .......................... 123/1 R |
| 2,534,346 | A | * | 12/1950 | Fenney .......................... 123/431 |
| 2,561,598 | A | * | 7/1951 | Schowalter .................... 123/1 R |

(Continued)

FOREIGN PATENT DOCUMENTS

WO        0178912         10/2001

OTHER PUBLICATIONS http://en.wikipedia.org/wiki/Camshaft; XP-002607943; Categories: Valvetrain/Engine Components: Last Modified Oct. 26, 2010.

*Primary Examiner* — Hoang Nguyen
(74) *Attorney, Agent, or Firm* — Rankin, Hill & Clark LLP

(57) ABSTRACT

An apparatus and method for producing explosions, including a pressure-resistance container having a main explosion chamber introduced therein, further including a supply line for supplying a flowable explosible material, and a drain opening for the directed drainage of gas pressure caused by the ignition of the explosible material. The drain opening is closed directly by a closure means, preferably a plunger, which is pressed against the drain opening using a gas spring and held closed substantially up to the time of ignition. Before the actual main explosion, the closure means is moved by the igniting and the pressure force of an auxiliary explosion, thereby exposing the drain opening.

16 Claims, 2 Drawing Sheets

(56) References Cited

U.S. PATENT DOCUMENTS

| | | |
|---|---|---|
| 3,429,396 A | 2/1969 | Jenner et al. |
| 3,670,840 A | 6/1972 | Gundlach |
| 3,981,379 A | 9/1976 | Sayous |
| 4,047,591 A | 9/1977 | Ward et al. |
| 4,487,179 A | 12/1984 | Hercher |
| 4,923,374 A | 5/1990 | Lundin et al. |
| 7,775,160 B2 * | 8/2010 | Ruegg .......................... 102/301 |
| 2012/0152183 A1 * | 6/2012 | Langham ........................ 123/2 |

* cited by examiner

METHOD AND DEVICE FOR PRODUCING EXPLOSIONS

BACKGROUND OF THE INVENTION

1. Field of the Invention

A method and to a device for producing explosions, in particular pressure impulses of a high intensity, according to the independent patent claims.

2. Description of Related Art

Different devices for producing pressure waves and pressure impulses, for example for cleaning boilers, are known. Such a device is described in WO2007/028264. With the device shown in this, it is possible to produce explosions with a high reproducibility. The object of the present invention is then to create a special design of this type of explosion generator.

BRIEF SUMMARY OF THE INVENTION

This object is achieved by the device and the method as are defined in the patent claims.

The device comprises a pressure-proof container with an exit opening for the pressure impulses, and a closure means closing the exit opening, for example a piston or a slide. The closure means is displaced by way of an auxiliary explosion into its position, in a manner such that it releases the exit opening. Delayed for releasing the exit opening, an explosion in a main explosion chamber is ignited in the pressure-proof container, wherein the pressure impulse which is produced by way of this exits through the exit opening which is now at least partly open. The auxiliary explosion chamber and the main explosion chamber are preferably introduced in a pressure-proof container.

First, an ignition of an auxiliary explosion is effected. This is carried out by an ignition device in or on the auxiliary explosion chamber. The ignition of the main explosion is effected in a delayed manner with regard to the ignition of the auxiliary explosion. The auxiliary explosion chamber and the main explosion chamber are preferably separated from one another by way of the closure means itself. The delay of the main explosion may be effected by way of an ignition device attached in or on the main explosion chamber, being ignited in a temporally delayed manner, e.g. by way of a delay circuit. However, it is also possible to lead the auxiliary explosion via a delay conduit installed between the auxiliary explosion chamber and the main explosion chamber. Then, the auxiliary explosion chamber comprises an ignition device and one may make do without an ignition device in or on the main explosion chamber.

The exit opening of the pressure-proof container is kept closed by the closure means. This is preferably effected by way of a spring element. The spring element may be a common spiral spring, but is preferably formed by a gas spring. Such a spring element also effects a return of the closure means after an explosion and permits a reproducibility of the method.

A substance capable of flowing and exploding or a mixture which is capable of flowing and exploding and which is formed by way of mixing components which per se are not capable of explosion, is introduced into the explosion chambers. The flowable substances and/or substance mixtures are for example gaseous, liquid, powder-like or powdery or a mixture of such component substances, preferably a mixture consists of two gases under pressure. Hereinafter, all variants and possible combinations of substances and mixtures are called flowable, explosible material, without this being seen as a limitation to a single substance or to a certain mixture.

By way of the ignition of the flowable, explosible material in the main explosion chamber, an explosion with a very high gas pressure results, said gas pressure being led away through the discharge opening which is closed previously or essentially until shortly before the ignition of the explosible material. The discharge opening thereby defines the direction of the exiting pressure wave.

The closure means is preferably opened so quickly, that the gas mixture under pressure in the main explosion chamber at the most partly before the actual ignition, may escape through the discharge opening which is already partly opened by the closure means. I.e. the gas mixture, with the ignition by way of this, continues to be under pressure and the produced explosion pressures are accordingly high. With the use, for example, of ethylene and oxygen in a stoichiometric ratio, an explosion pressure arises which is approx. 25 times greater than a pressure at the point in time of an ignition. An aim of the method is to produce pressure impulses with an as high as possible pressure peak. For this, the closure means is preferably moved with a maximum speed, so that at the point in time of the ignition of the main explosion, the gas pressure continues to remain as high as possible despite the open exit opening. For producing such a high closure means speed, the gas mixture which is preferably likewise under pressure, is brought to explode in the auxiliary explosion chamber. By way of this, the very high auxiliary explosion pressure acts on the closure means and greatly accelerates this. The movement of the closure means may be subsequently braked by a spring element.

The complete device may be constructed in a very simple manner, due to the fact that a closure means closes the discharge opening and the arrangement of the device is designed such that due to the ignition of an auxiliary explosion, the closure means is displaced and thus the discharge opening is released in a direct manner. In particular, the device may be constructed of very few parts. Apart from the closure means, preferably no other moving parts are used. These are subjected to extreme material loading under the high loads as occur with the production of explosions of this high intensity. In order to create a device which permits a repetitive production of explosions, it is necessary or particularly advantageous to have a method moving in an as straight-lined as possible manner whilst optimally taking care of the particularly loaded parts. This is the case with the method according to the invention and with the corresponding device.

In a preferred embodiment of the device, the main explosion chamber and the closure means are arranged in the pressure-proof container in a manner such that the filling pressure of the main explosion chamber, thus the gas pressure with which the explosion chamber is filled with flowable, explosible material before the triggering of the ignition, acts perpendicularly to a movement direction of the closure means. This has the advantage that in the completely closed condition of the device, a spring element does not need to act against this filling pressure, but only against the filling pressure in the auxiliary explosion chamber, thus neither in order to be able to keep a discharge opening closed, nor in order to be able to release the discharge opening against this force.

In one embodiment of the invention, the closure means after an initial displacement and release of the discharge opening, is yet additionally accelerated after this by way of the filling pressure or the explosion pressure of the main explosion chamber, and pushed to the rear.

With the use of two independent ignition devices for the auxiliary explosion and main explosion, the filling pressures and the composition of the flowable, explosible material in the auxiliary explosion chamber and main explosion chamber may be different from one another. Thus in the same system, one may produce different explosion pressures for the drive and for the pressure impulse, by which means a high flexibility with regard to design and the use of the applied means may be achieved with the same device.

By way of a suitable arrangement of the auxiliary explosion chamber and main explosion chamber and a gas spring chamber by way of the design of the pressure-proof container and the closure means arranged therein, functioning as a valve for the discharge opening, these chambers may be separated from one another by way of the single closure means which is preferably designed as a piston, and may also be sealed by way of this.

The device is preferably used for cleaning boilers in large installations such as waste incineration installations, coal-fired power stations, silos, for getting rid of slag or deposits, etc. There, the significant advantage lies in the individual cleaning cycles being able to be repeated in a very rapid and multiple manner. The use of gases as a cleaning material for producing the explosions and the pressure impulses which this entails is also very favourable, and one may produce high explosion pressures. The leading of substances which per se are not explosible, at a point in time shortly before the triggering of the explosion, furthermore greatly increases the safety with regard to persons and the installation. It is also permits a cleaning with an installation which is still warm or in a hot installation which is in operation, since no explosible substances are subjected to the hot environment over a longer time. The produced pressure wave may thereby be led via a pipe over longer distances into a boiler, to the location to be cleaned. The pipe may be installed on the installation to be cleaned in a fixed manner, but may also be inserted from the outside, for example in a telescopically displaceable manner into an installation or a boiler. Coatings and contamination are blown away from the boiler pipes and boiler walls by way of the pressure impulse produced with the explosion, and the pipes and walls are simultaneously set into oscillation. Both actions effect an efficient cleaning away of the insulations to be cleaned.

Various further use possibilities are conceivable with which a greater, quicker force impact, pressure impulse or a pressure wave of a high intensity and/or (rapid) reproducibility is required. Examples are pressure producers for pressure sheet-metal forming or as a drive for projectile weapons with which the pressure impulse is used for accelerating a projectile.

Since the exit speed of the explosion gases out of the exit opening and, thus, also the produced thrust is larger than with a continuous combustion in rocket motors, the use of the method according to the invention and the device for the drive of spacecraft or as a pulse detonation engine is also conceivable.

BRIEF DESCRIPTION OF THE DRAWINGS

The invention is hereinafter represented by way of exemplary embodiment forms. Thereby there are shown in.

DETAILED DESCRIPTION OF THE INVENTION

Figure 1:
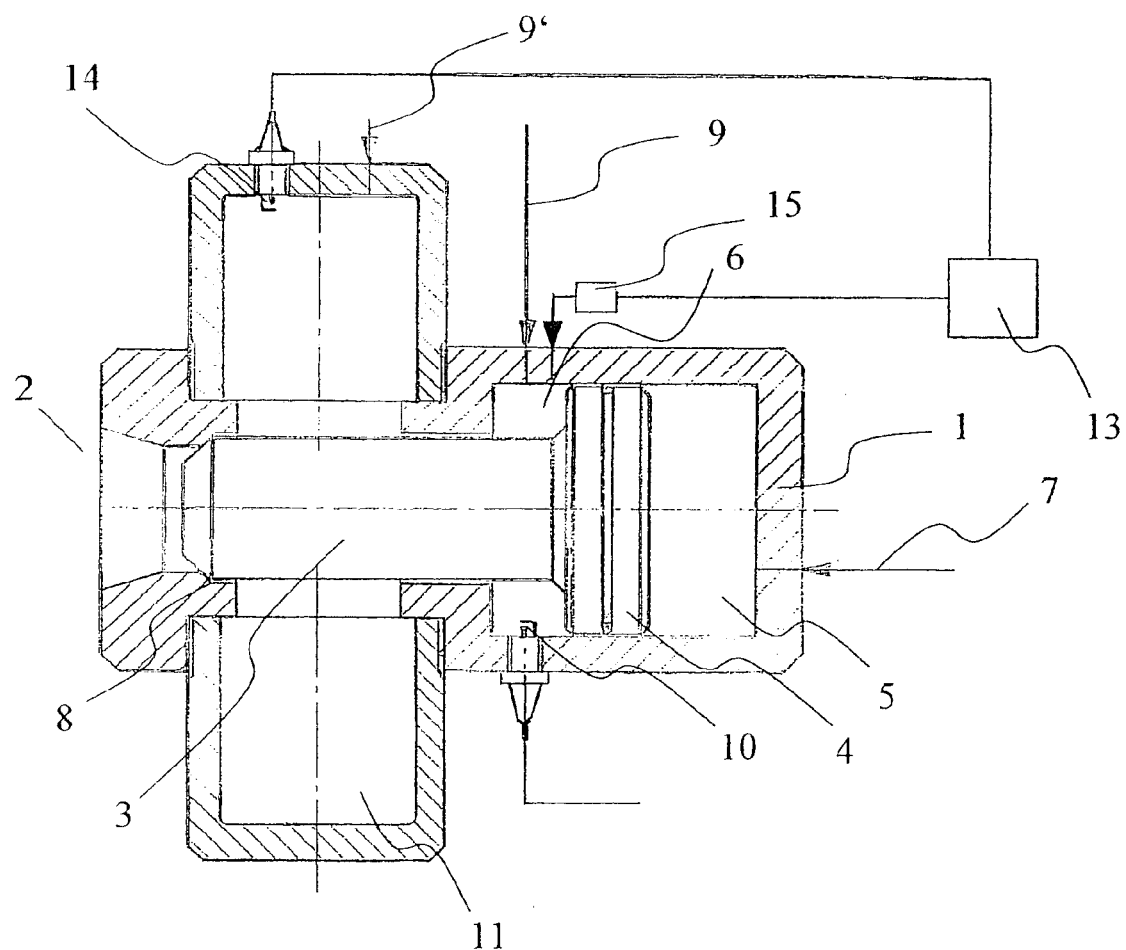
FIG. 1 an explosion generator with two ignition devices.

An explosion generator with a pressure-proof container 1 and with a discharge opening 2 located in the container are shown in FIG. 1. A piston 3 which is displaceable in the container serves as a valve for closing and keeping closed the discharge opening. The rear end 4 of the piston has an enlarged diameter and a seal, in a manner such that the rear end slides in a tight manner on the inner container wall, preferably in a complete manner. The pressure-proof container in a rear region comprises a first chamber which is divided by way of the rear end of the piston into two part chambers. The one part chamber is the gas spring chamber 5, the other the auxiliary explosion chamber 6. The gas spring chamber 5 is filled with a gas, e.g. air, nitrogen, $CO_2$ etc., said gas being led through a gas filling opening 7 provided for this, into the gas spring chamber 5. The frontmost end of the piston 3, the valve, is pushed against the valve seat 8 in the discharge opening by way of the gas pressure or closure pressure in the gas spring chamber. This closure pressure is so high that it is capable of leading the piston into a closure piston and of holding it there, also against a filling pressure in the auxiliary explosion chamber, and thus securely closes the discharge opening.

The auxiliary explosion chamber 6 is filled via a feed conduit 9 with an explosible mixture, e.g. oxygen and ethylene. The ignition of an auxiliary explosion in the auxiliary explosion chamber is effected via an ignition device 10, e.g. a spark plug or glow plug or by way of a powerful laser beam which is led into the device. By way of the high pressure which arises due to the ignition of the explosible mixture in the auxiliary explosion chamber 6, the piston is pressed and moved to the rear, opposite to the force of the gas spring. The discharge opening 2 is opened by way of pushing back the piston and the piston now is accelerated even further and moved to the rear on account of the force of the filling pressure in a main explosion chamber 11.

The main explosion chamber 11 is arranged in the front part of the pressure-proof container. This, in this embodiment, consists of two pipes which are arranged laterally at right angles to the piston and are closed at one side. The pipes are filled with an explosible material likewise via a feed conduit 9', as the case may be, also via the same one as that of the auxiliary explosion chamber. The explosible material for the main explosion is preferably the same as that for the auxiliary explosion. The filling pressure of the main explosion chamber thereby acts essentially perpendicularly on the piston and in this situation has no influence on the position.

On filing both explosion chambers, the substances used for an explosible mixture are filled in one after another up to a ratio which is as stoichiometric as possible. It is also possible to fill individual substances in a suitable ratio prior to this into a separate pressure container with the same pressure and to lead these substances out of the pressure containers into the explosion chambers, in order to achieve a good through-mixing.

After the ignition of the auxiliary explosion by way of the ignition device 10, a pressure sensor 15 registers a pressure increase in the auxiliary explosion chamber. This signal, in a delayed manner via a delay switch 13, e.g. a time relay, triggers the ignition device 14 in the main explosion chamber and thus the main explosion. Instead of an external pressure sensor, the piston path itself may activate the ignition of the main explosion, for example by way of an ignition switch being actuated by the moving piston. It would also be possible to directly connect the two ignition devices 10, 14 of the auxiliary explosion chamber and the main explosion chamber by way of a delay switch. The control of the delay via a pressure sensor or an ignition switch however ensures that, for example, with a faulty ignition in the auxiliary explosion chamber, no main explosion is ignited with the discharge opening still closed.

Figure 2:
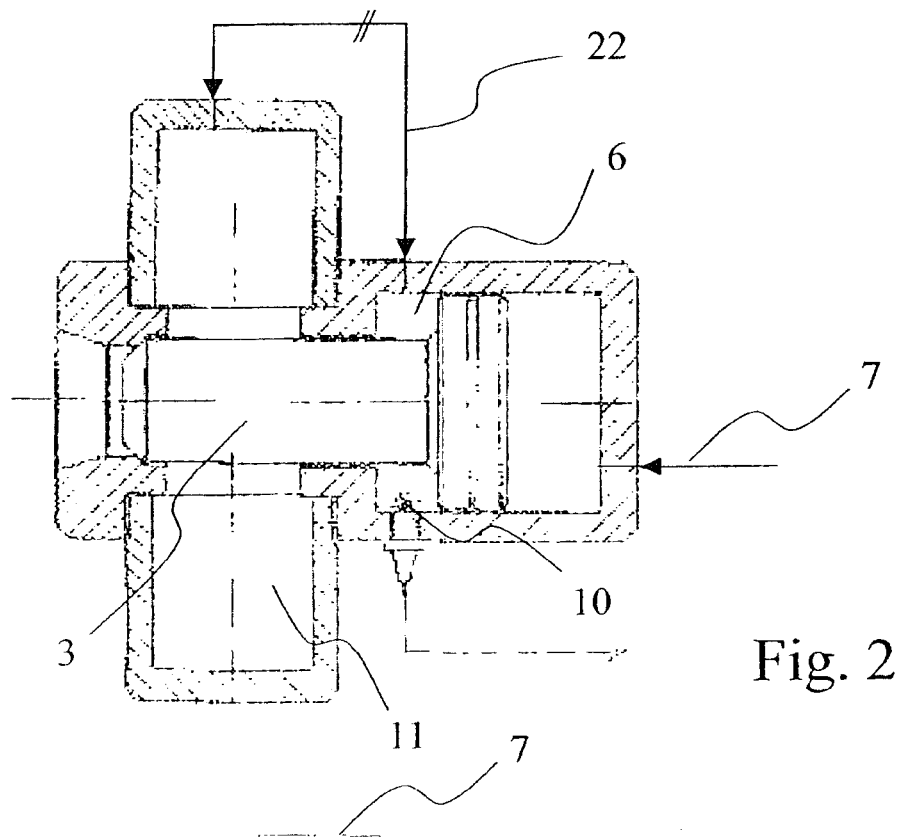
FIG. 2 an explosion generator with a delay conduit.

It is also possible to create a delay by way of a delay conduit 22 as is shown in FIG. 2. By way of this delay conduit lead 22 or ignition conduit, the explosion is led from the auxiliary explosion chamber 6 into the main explosion chamber 11. The delay time is then determined by the length of the conduit as well as the explosion speed, and no separate ignition device is required in the main explosion chamber. The filling of the main explosion chamber may then be effected through the delay conduit 22, so that also no separate feed conduit 22 is necessary in the main explosion chamber. In the shown example, the main explosion chamber comprises a feed conduit 9 and the auxiliary explosion chamber 6 is filled via the delay conduit. The auxiliary explosion chamber and the main explosion chamber are subjected to the same filling pressures with this filling method.

With the use of two ignition device, preferably "rapid" devices such as spark plugs or laser ignitions are used, since both ignitions must be effected at a precise point in time. Such parallel ignition devices are also preferred with a coordination of several devices according to the invention. With the use of several devices arranged in parallel, mutually amplifying effects may occur and be utilised. For example, for cleaning large boilers, by way of simultaneous ignition of several explosions in several explosion generators, the pressure waves or pressure impulses may accumulate, so that by way of this, the cleaning effect is intensified or instead of this, the number of cleaning devices may be reduced. With the use of a delay conduit and accordingly only one ignition device in an auxiliary explosion chamber, this for example may be a "slow" glow plug which requires a few seconds, approx. 3 s to heat up. A new type of ignition is the ignition by way of laser, a laser ignition which is not yet known as an ignition device in explosion generators or pressure wave generators. Thereby, a laser beam is coupled into the pressure-proof container. The laser beam thereby may ignite the gas in a direct manner or, however, it heats a certain location of the surface in the container, at which the explosible gas located in the container then ignites. For this, the pressure-proof container comprises a window which is transparent to the respective laser wavelength. The advantage of this device is that no ignition elements are in the chamber which are subjected to wear, are contaminated or may be destroyed by the explosion. Also no electrical lead-throughs are required in the pressure-proof container. A laser beam may be focussed to very high energy densities, is very precise, may be very accurately set with regard to time and may even use surface contaminations which would be disadvantageous with other ignition devices.

The forces acting on the piston or generally on the closure means and in particular the heat arising with the escape of the pressure wave, are extremely high in the region of the piston discharge opening. By way of the auxiliary explosion, the piston is already displaced out of the region of the discharge opening to the rear and thus spared, already before the actual explosion. Simultaneously however, the produced pressure wave may leave the device in an unhindered and unbraked manner. The temporal staggering of the two explosions in a preferred embodiment is in the range of a few milliseconds, preferably 0.2-10 milliseconds, e.g. 0.5-2 milliseconds.

The gas in the gas spring chamber continues to be further and further compressed by way of the moving-back piston. By way of this, on the one hand one prevents the piston from abutting the rear wall of the pressure container without being braked, due to the explosion and on the other hand the piston is subsequently brought back into its starting position, the closure position of the discharge opening, as soon as the actual explosion has passed. With this, after an explosion, the device is automatically in the starting position and the explosion production method may be started afresh with the filling of the chambers.

Figure 3:
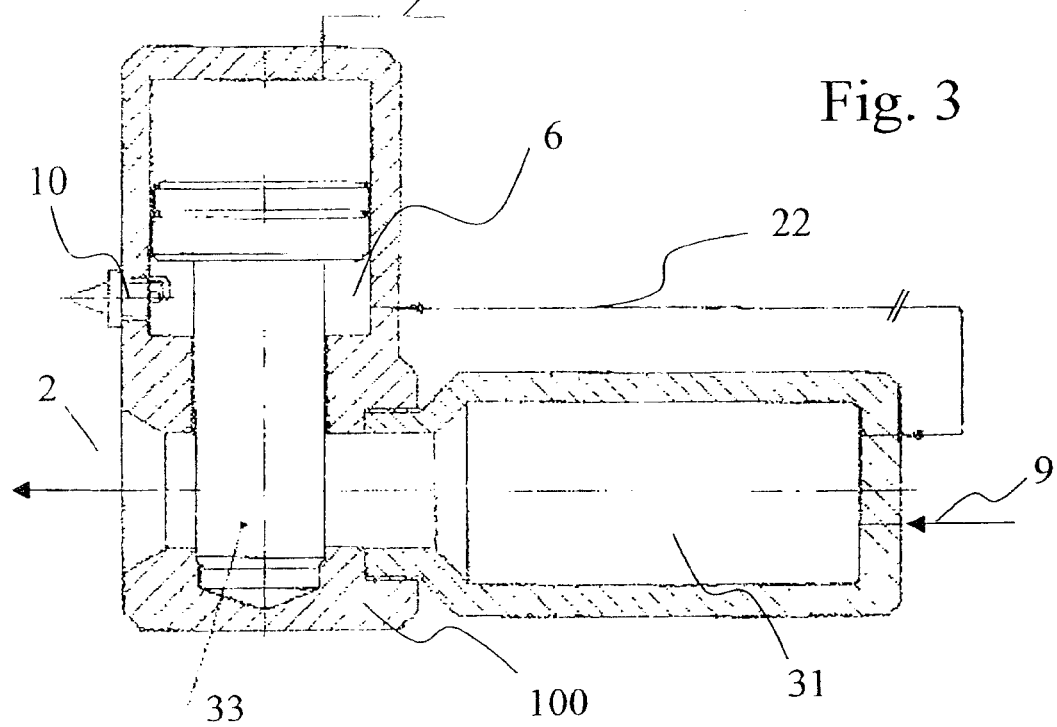
FIG. 3 an explosion generator with a slider.

An explosion generator is shown in FIG. 3, in which the discharge opening 2 is held closed by a slider 33. The main explosion chamber 31 is arranged in the flush direction to the discharge opening in the pressure-proof container 100. The slider moves parallel to the plane of the discharge opening or perpendicular to the discharge direction (arrow) which is defined by the discharge opening. The principle of the main explosion chamber, the gas spring chamber and slider is constructed in an essentially equal manner, as with the piston according to FIG. 2, wherein here these two chambers are arranged perpendicularly to be discharge direction. The slider is preferably designed in a flat manner, but may however also be designed as a cylinder (piston) or rectangle and comprise a piston drive or be designed directly as such. An ignition in the auxiliary explosion chamber is activated with the help of an ignition device 10 after filling the auxiliary explosion chamber and main explosion chamber via the common feed conduit 9. The explosion is subsequently led into the main explosion chamber 31 via a delay conduit 22.

Exemplary values for a device for producing explosions are specified hereinafter:
volume main explosion chamber: 1-3 lt
gas filling pressure (explosion chambers): 10-30 bar, e.g. 15-25
diameter, discharge opening: 40-80 mm

The invention claimed is:

1. A device for producing explosions, comprising:
a pressure-proof container with a main explosion chamber which is introduced therein and with an auxiliary explosion chamber with an ignition device,
at least one feed conduit for feeding a flowable, explosible material,
a discharge opening for the directed discharge of the gas pressure produced by the ignition of the explosible material in the main explosion chamber,
a closure means which closes the discharge opening and which, by way of the pressure force of an explosion in the auxiliary explosion chamber, releases the discharge opening, and
a delay means between the main explosion chamber and the auxiliary explosion chamber, for the delayed ignition of a main explosion in the main explosion chamber.

2. A device according to claim 1, wherein the pressure-proof container comprises a spring element, with which the closure means may be held in a closure position of the discharge opening and may be led back into this.

3. A device according to claim 2, wherein the spring element is a gas spring in a gas spring chamber which is filled with gas.

4. A device according to claim 1, wherein the main explosion chamber comprises an ignition device.

5. A device according to claim 1, wherein the delay means is a time relay which activates the ignition device.

6. A device according to claim 1, wherein the delay means is a delay conduit between the auxiliary explosion chamber and the main explosion chamber, for leading the explosion into the main explosion chamber.

7. A device according to claim 1, wherein the main explosion chamber and the closure means closing the discharge opening, are arranged such that a filling pressure in the main explosion chamber acts perpendicularly to the movement direction of the closure means.

8. A device according to claim 7, wherein the closure means is a slider and the main explosion chamber is arranged parallel to a discharge direction defined by the discharge opening.

9. A device according to claim 7, wherein the closure means is a piston and the main explosion chamber is arranged perpendicular to a discharge direction defined by the discharge opening.

10. A device according to claim 1, wherein the ignition device is a spark plug, glow plug or a laser ignition.

11. A method for producing explosions, comprising the following steps:
   leading a closure means into a closure position of a discharge opening in a pressure-proof container;
   filling a main explosion chamber and an auxiliary explosion chamber in the pressure-proof container with a flowable, explosible material;
   igniting the flowable, explosible material in the main explosion chamber and by way of this, producing a pressure wave which escapes via the opened discharge opening,
   wherein
   before the ignition in the main explosion chamber, the flowable, explosible material in the auxiliary explosion chamber is made to explode, and that due to the pressure force of the auxiliary explosion, the closure means is moved in a manner such that at the point in time of the main explosion, the discharge opening is at least partly opened.

12. A method according to claim 11, wherein the closure means, by way of a spring element, which is a gas spring, is held in a closure position and is led back to this, also without a pressure impingement of the main explosion chamber and/or the auxiliary explosion chamber.

13. A method according to claim 11, wherein a delay between the ignition of the auxiliary explosion and the main explosion is less that 10 milliseconds.

14. A method according to claim 11, wherein a released pressure impulse is led via a pipe to an active location/site of action.

15. A method according to claim 11, wherein a mixture of a gaseous hydrocarbon and oxygen is used as a flowable, explosible material.

16. A method according to claim 11, wherein a gas mixture with a pressure of at least 2 bar, is used as a flowable, explosible gas mixture.

* * * * *